United States Patent [19]

Gray et al.

[11] Patent Number: 4,768,159
[45] Date of Patent: Aug. 30, 1988

[54] SQUARED-RADIX DISCRETE FOURIER TRANSFORM

[75] Inventors: Joseph H. Gray, Berkely; Mark R. Greenstreet, Palo Alto, both of Calif.

[73] Assignee: TRW Inc., Redondo Beach, Calif.

[21] Appl. No.: 77,048

[22] Filed: Jul. 20, 1987

Related U.S. Application Data

[63] Continuation of Ser. No. 674,624, Nov. 26, 1984, abandoned.

[51] Int. Cl.[4] ............................................. G06F 15/332
[52] U.S. Cl. .................................................... 364/726
[58] Field of Search ......................................... 364/726

[56] References Cited

U.S. PATENT DOCUMENTS

| | | | |
|---|---|---|---|
| 4,282,579 | 8/1981 | Speiser et al. | 364/726 |
| 4,293,921 | 10/1981 | Smith, Jr. | 364/726 |
| 4,602,350 | 7/1986 | Gray | 364/726 |

*Primary Examiner*—David H. Malzahn
*Attorney, Agent, or Firm*—Noel F. Heal; Benjamin DeWitt

[57] ABSTRACT

A radix-$N^2$ or radix-$N^4$ discrete Fourier transform (DFT) processor having cascaded stages alternately comprising $N^2$-sample memories and radix-N DFT's. Data is written into and read from the memories in a sequence permitting data to be written into a memory address immediately after the previously stored data is read from the same memory address, thereby avoiding the need for double-buffered memory. In one embodiment of the invention, two radix-$N^2$ processors are cascaded to produce a radix-$N^4$ DFT processor with even greater memory savings.

7 Claims, 5 Drawing Sheets

SQUARED-RADIX DISCRETE FOURIER TRANSFORM

This application is a continuation of application Ser. No. 674,624, filed Nov. 2, 1984, now abandoned.

BACKGROUND OF THE INVENTION

The present invention relates generally to digital signal processing hardware, and more specifically, to a processor for obtaining the Discrete Fourier Transform (DFT) of a digital signal.

The Discrete Fourier Transform (DFT) of a digital signal represents the spectral content of the signal. Processors for obtaining the DFT of a signal are commonly used for spectral analysis and filtering of digital signals.

Considerable design effort during the last 20 years has been directed at simplifying the arithmetic hardware in DFT processors in order to improve processing speed and reduce costs. Many such designs implement a large-radix DFT by cascading two or more stages of smaller-radix DFT's.

These designs generally require large data storage memories between each DFT stage, and the memories often cost much more than the arithmetic elements, so that the DFT processor is undesireably costly.

Also, most DFT processor designs require tandem or double-buffered memories which take turns reading and writing because the data must be written into memory in one order and read out in a different order.

SUMMARY OF THE INVENTION

The present invention is a radix-$N^2$ DFT processor comprising cascaded stages alternately comprising $N^2$-sample memories and radix-N DFT's. Data is written into and read from the memories in a sequence permitting data to be written into a memory address immediately after the previously stored data is read from that memory address, thereby avoiding the need for double-buffered memory.

Two radix-$N^2$ processors can also be cascaded to produce a radix-$N^4$ DFT processor with proportionately even greater memory savings.

DETAILED DESCRIPTION OF THE PREFERRED EMBODIMENTS

The structure of a radix-$N^2$ or radix-$N^4$ DFT processor according to the present invention can be better understood with reference to the mathematical expression for a DFT.

In the following discussion, all data values are complex numbers, and a "word" of memory shall refer to the amount of memory required to store the real and imaginary parts of a single data value.

A radix-N DFT is a transform from a sequence of input data values x(n) in the n-domain to a sequence of transformed data values X(k) in the k-domain, defined as follows:

$$X(k) = \sum_{n=0}^{N-1} x(n)\exp(-j2\pi nk/N) \text{ for } k=0,1,2,\ldots N-1 \quad (1)$$

Similarly, a radix-$N^2$ DFT is defined as:

$$X(k) = \sum_{n=0}^{N^2-1} x(n)\exp(-j2\pi nk/N^2) \text{ for } k=0,1,2,\ldots N^2-1 \quad (2)$$

A radix-$N^2$ DFT can be decomposed into two cascaded radix-N DFT's by redefining the one-dimensional indices n and k as the two-dimensional indices $(n_1,n_2)$ and $(k_1,k_2)$ as follows:

$$n=n_2+Nn_1 \text{ for } n_1, n_2=0,1,\ldots N-1 \quad (3)$$

$$k=k_1+Nk_2 \text{ for } k_1, k_2=0,1,\ldots N-1 \quad (4)$$

Substituting Equations (3) and (4) into Equation (2) yields:

$$\begin{aligned}
X(k_1,k_2) &= \sum_{n_2=0}^{N-1}\sum_{n_1=0}^{N-1} x(n_1,n_2)\exp\left[-j2\pi(n_2+Nn_1)(k_1+Nk_2)/N^2\right] \\
&= \sum_{n_2=0}^{N-1} T(k_1,n_2)\left[\sum_{n_1=0}^{N-1} x(n_1,n_2)\exp(-j2\pi n_1 k_1/N)\right] \cdot \exp(-j2\pi n_2 k_2/N) \\
&= \sum_{n_2=0}^{N-1} T(k_1,n_2) Y(k_1,n_2)\exp(-j2\pi n_2 k_2/N) \\
&= \sum_{n_2=0}^{N-1} S(k_1,n_2)\exp(-j2\pi n_2 k_2/N)
\end{aligned} \quad (5)$$

where $$Y(k_1, n_2) = \sum_{n_1=0}^{N-1} x(n_1,n_2)\exp(-j2\pi n_1 k_1/N) \quad (6)$$

$$T(k_1,n_2)=\exp(-j2\pi n_2 k_1/N^2) \quad (7)$$

and $$S(k_1,n_2)=T(k_1,n_2)\cdot Y(k_1,n_2) \quad (8)$$

Figure 1:
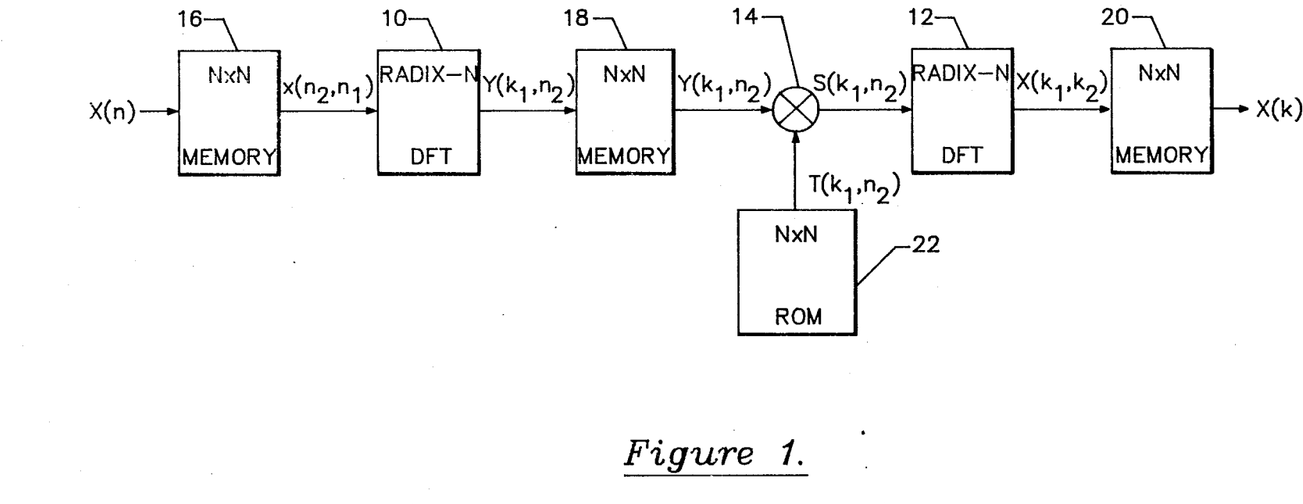
FIG. 1 is an electrical circuit block diagram of a radix-$N^2$ DFT processor according to the present invention.

FIG. 1 shows how Equations (5)–(8) can be implemented by cascading two radix-N DFT processors 10 and 12, a multiplier 14, three N by N word read/write memories 16, 18 and 20, and one N by N word read-only memory (ROM) 22. Any conventional DFT processor design can be used for the two DFT processors 10 and 12. Similarly, conventional designs can be used for the multiplier 14, memories 16, 18 and 20, and ROM 22.

The expression for $Y(k_1,n_2)$ in Equation (6) is identical to the definition of a radix-N DFT in Equation (1), where $n_1$ and $k_1$ replace n and k, and $n_2$ is an additional parameter. This means that the sequence of values $Y(k_1,n_2)$ is the radix-N DFT of $x(n_1,n_2)$ obtained by holding $n_2$ as a parameter and transforming the input data sequence $x(n_1,n_2)$ in the $n_1$-domain. This is repeated for each value of $n_2$ from 0 to $N-1$.

Accordingly, FIG. 1 shows that in the present invention a radix-N DFT processor 10 receives $x(n_1,n_2)$ at its input and produces the transformed sequence $Y(k_1,n_2)$ at its output.

The memories 16 and 18 preceding and following DFT processor 10 function to supply the data to each stage in the apparatus in the proper sequence, as will be explained subsequently.

The set of constants $T(k_1,n_2)$ defined in Equation (7) is stored in a $N^2$-word read-only memory 22. These constants may also be referred to as "weighting factors" or "twiddle factors".

Referring to Equation (8), each value in the sequence $S(k_1,n_2)$ is the product of (i) the corresponding value in the sequence $Y(k_1,n_2)$ and (ii) the corresponding constant $T(k_1,n_2)$. Accordingly, FIG. 1 shows that in the present invention a multiplier circuit 14 receives the sequence of values $Y(k_1,n_2)$, multiplies each value in the sequence by the corresponding constant $T(k_1,n_2)$, and outputs the sequence $S(k_1,n_2)$.

Comparing Equation (5) to Equation (1), it can be seen that the sequence of transformed data values $X(k_1,k_2)$ is the radix-N DFT of $S(k_1,n_2)$ obtained by holding $k_1$ as a parameter and transforming the sequence $S(k_1,n_2)$ in the $n_2$-domain into the transformed sequence $X(k_1,k_2)$ in the $k_2$-domain. Accordingly, FIG. 1 shows that in the present invention a radix-N DFT processor 11 receives $S(k_1,n_2)$ at its input and produces the transformed sequence $X(k_1,k_2)$ at its output.

Now the data reordering function of memories 16, 18 and 20 will be explained. The $N^2$ values of the input data sequence $x(n)$ arrive at the input of memory 16 in the order $x(0), x(1), x(2), \ldots x(N^2-1)$, i.e., in the order wherein the index n increments from 0 to $N^2-1$. According to the definition of the indices $n_1$ and $n_2$ in Equation (3), this is equivalent to the order wherein the index $n_2$ increments from 0 to $N-1$ while the index $n_1$ is held fixed at $n_1=0$, then $n_2$ increments from 0 to $N-1$ while $n_1$ is held fixed at $n_1=1$, and so on through $n_1=N-1$.

If the input data sequence $x(n)$ is thought of as being organized into an N by N matrix in which indices $n_1$ and $n_2$ represent the row and column numbers, respectively, of each position in the matrix, then the input data $x(n)$ arrives in row order, i.e., it arrives one row at a time.

As explained above, DFT processor 10 performs a succession of DFT's with $n_2$ (the column number) held as a fixed parameter and with $n_1$ (the row number) being the index over which the transform is performed. Therefore, the DFT processor 10 must receive the input data $x(n)$ in column order, i.e., one column at a time.

However, it was just explained that the input data $x(n)$ arrives in row order rather than column order. Therefore, the input data must be reordered before it is provided to DFT processor 10.

Memory 16 performs this reordering. Memory 16 receives and stores all $N^2$ values of the input data sequence $x(n)$ one row at a time, and then reads out the data one column at a time. The left half of Table 1 shows the order in which the data is stored in memory 16, and the right half of Table 1 shows the order in which that data is subsequently read out of the memory 16 and transmitted to DFT processor 10.

TABLE 1

| RAM Input and Output Sequence ($N^2 = 16$, M = 2) | | | | | |
|---|---|---|---|---|---|
| INPUT (WRITE) | | | OUTPUT (READ) | | |
| n (Address) | $n_1$ (Row) | $n_2$ (Column) | n (Address) | $n_1$ (Row) | $n_2$ (Column) |
| 0 | 0 | 0 | 0 | 0 | 0 |
| 1 | 0 | 1 | 4 | 1 | 0 |
| 2 | 0 | 2 | 8 | 2 | 0 |
| 3 | 0 | 3 | 12 | 3 | 0 |
| 4 | 1 | 0 | 1 | 0 | 1 |
| 5 | 1 | 1 | 5 | 1 | 1 |
| 6 | 1 | 2 | 9 | 2 | 1 |
| 7 | 1 | 3 | 13 | 3 | 1 |
| 8 | 2 | 0 | 2 | 0 | 2 |
| 9 | 2 | 1 | 6 | 1 | 2 |
| 10 | 2 | 2 | 10 | 2 | 2 |
| 11 | 2 | 3 | 14 | 3 | 2 |
| 12 | 3 | 0 | 3 | 0 | 3 |
| 13 | 3 | 1 | 7 | 1 | 3 |
| 14 | 3 | 2 | 11 | 2 | 3 |
| 15 | 3 | 3 | 15 | 3 | 3 |

Read/write memory 16 can be a conventional random access memory (RAM) 24 having $N^2$ words addressed by a 2M-bit address line connected to a 2M-bit counter 26, where $M = \log_2 N$. However, memory 16 can be thought of as a RAM organized into N rows and N columns where the indices $n_1$ and $n_2$ designate the M-bit row and column addresses, respectively. The input and output ordering shown in Table 1 consists of storing the input data $x(n)$ into the memory 16 one row at a time, and then reading the data out of the RAM one column at a time.

Figure 2A:
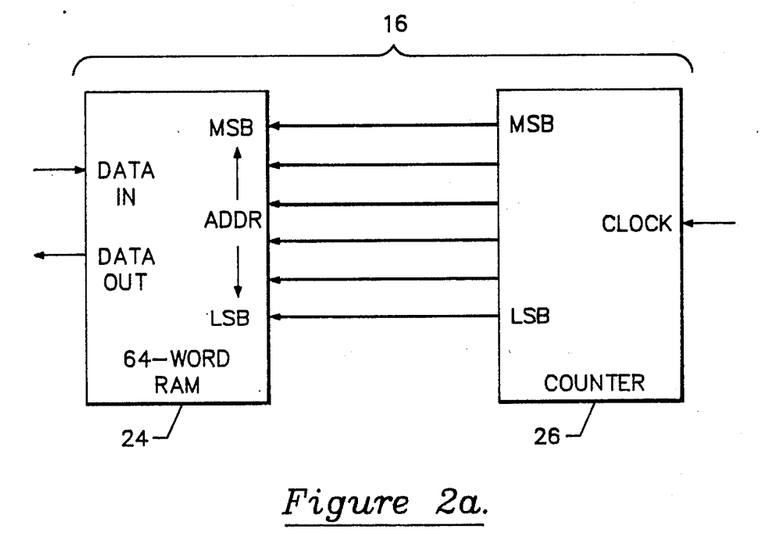
FIGS. 2a and 2b are block diagrams of an upper-/lower address reversing memory showing the two addressing modes.
Figure 2B:
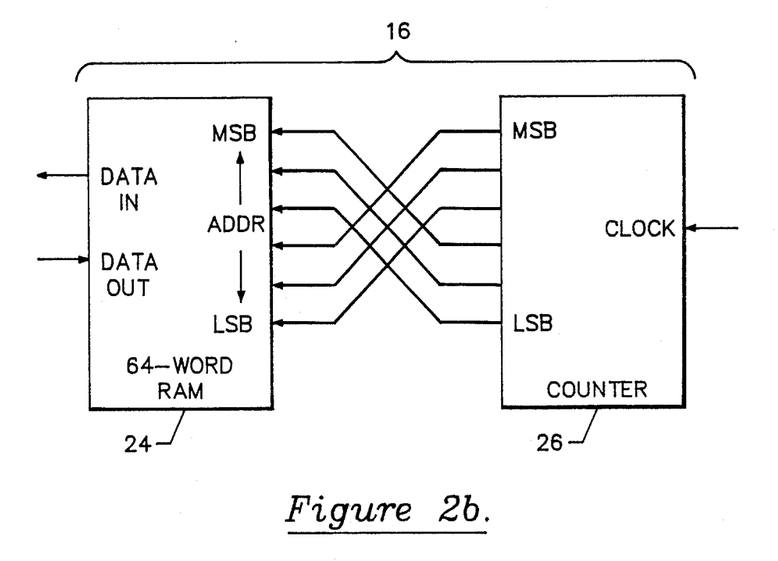

The M-bit row and column addresses $n_1$ and $n_2$ of memory 16 may be implemented as the upper and lower halves of the 2M-bit address n of the RAM 24. As shown in FIG. 2a, the input data $x(n)$ may be stored in RAM 24 in the correct order by using a 2M-bit counter 26 to select the RAM address into which each data value $x(n)$ is stored in sequence. As shown in FIG. 2b, the data may be read from RAM 24 in the required order by swapping the connections of the upper and lower halves of the 2M-bit address lines between counter 26 and RAM 24. This is equivalent to swapping the row and column indices $n_1$ and $n_2$.

The ordering of data values illustrated in column 4 of Table 1 will be referred to herein as "reversed upper/lower address ordering", because it is obtained by swapping the upper and lower (most significant and least significant) digits of the address or index number of the original data sequence $x(n)$.

The reordering of the sequence of data $x(n)$ performed by memory 16 by swapping row and column indices is symmetrical and self-inverting in the sense that storing data in row order and then reading it out in column order produces the same result as storing the data in column order and then reading it out in row order. It will now be explained how this symmetry can be exploited in the present invention to avoid any necessity for tandem or double-buffered memories.

The foregoing discussion only dealt with the processing of a single length-$N^2$ set of data values. In practice the DFT system must receive a succession of such data sets and successively compute the transform of each set. The processing speed or throughput performance of the system is determined by the speed with which the system can process a continuous stream of data sets.

In conventional DFT processors, a memory used to store and reorder data between first and second computational stages must first store the complete data sequence produced by the first computational stage, then read out the reordered data and transmit it to the second computational stage. The memory can't receive a new set of data until it finishes reading out the current set of data. Therefore, the first computational stage can't begin producing a new set of data until the second computational stage has completely received the current data. Similarly, the second stage can't begin processing a new set of data until the complete sequence is stored in the memory.

This requires the two computational stages to take turns waiting for each other to read from or write into the memory, which reduces the computational speed or throughput of the system by as much as a factor of two. The conventional solution to this problem is the use of tandem or double-buffered memories. In this scheme, two memories operate in tandem to alternately store data from the first stage and read out previously stored data to the second stage. This, of course, requires the use of twice as much memory.

The present invention does not require double-buffered memories to achieve maximum throughput because of the symmetry of the row and column swapping performed by the memory 16. Specifically, it doesn't matter whether the data is stored in row order and then read out in column order, or else stored in column order and then read out in row order. Thus, while a first set of data is being read out by columns, the next (i.e., second) set of data can be simultaneously stored by columns. More specifically, after a previously stored data value is read out of a particular memory address, the corresponding data value from the next data set can be stored in that memory address. After the first set of data has been read out and the second data set simultaneously stored by columns, the memory can then begin reading out the second data set by rows and simultaneously storing a third data set by rows. In other words, the odd-numbered data sets are stored by rows and read out by columns, and the even-numbered data sets are stored by columns and read out by rows.

Memories 18 and 20 each perform the same data reordering function as memory 16, and everything stated in the foregoing discussion about the implementation and operation of memory 16 also applies to each of memories 18 and 20.

Although FIG. 1 shows multiplier 14 following memory 18, the operation of the system would be the same if the multiplication by the weighting factors $T(k_1, n_2)$ were performed before the data was reordered by memory 18 rather than after the reordering. In other words, multiplier 14 and memory 18 could be interchanged in the system diagram of FIG. 1.

Memory 16 could be omitted if some other means were provided for supplying the input data to DFT processor 10 in the required order, which is "reversed upper/lower address" order, as illustrated in the fourth column of Table 1. Similarly, memory 20 could be omitted if use could be made of the transformed data X(k) in the order in which it is produced by DFT processor 12, which is also "reversed upper/lower address" order. For example, memory 20 could be omitted if the output X(k) of the radix-$N^2$ DFT system were being connected to another similar processor which required input data in reversed upper/lower address order.

This completes the explanation of the radix-$N^2$ DFT processor of the present invention. It will now be explained how two such systems can be cascaded to implement a radix-$N^4$ DFT processor.

Figure 3:
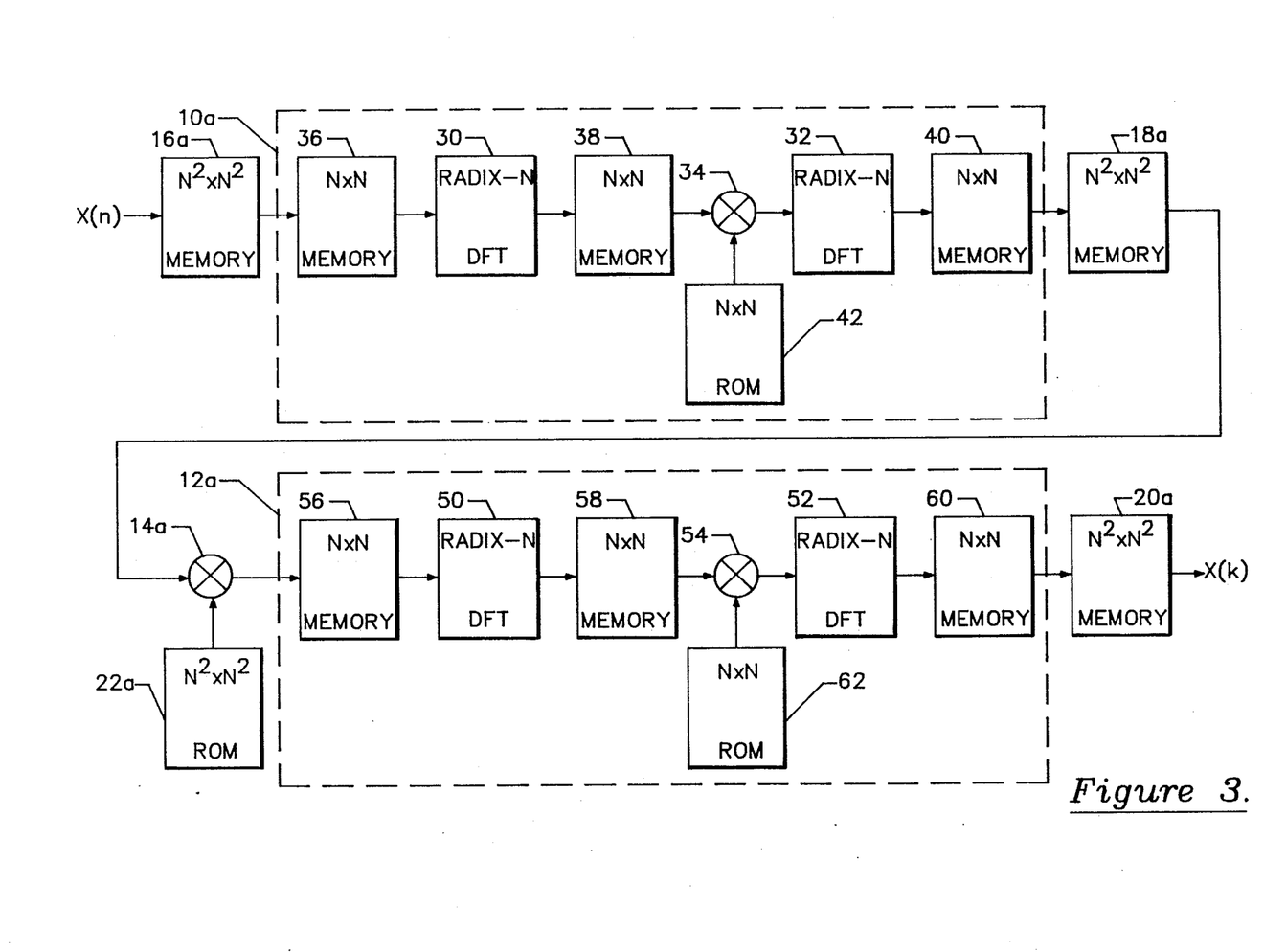
FIG. 3 is a block diagram of a radix-$N^4$ DFT processor according to the present invention.

FIG. 3 shows a radix-$N^4$ DFT processor constructed by substituting $N^2$ for N in the block diagram of FIG. 1, and substituting an entire radix-$N^2$ DFT processor system 10a and 12a, respectively, for each of the two radix-N DFT processors 10 and 12.

In FIG. 3, circuits 10a–22a of the radix-$N^4$ system correspond to circuits 10–22 of the radix-$N^2$ system shown in FIG. 1. Within the radix-$N^2$ DFT 10a in FIG. 3, circuits 30–42 are identical to circuits 10–22, respectively, in FIG. 1. Similarly, within the radix-$N^2$ DFT 12a in FIG. 3, circuits 50–62 are identical to circuits 10–22, respectively, in FIG. 1.

Figure 4:
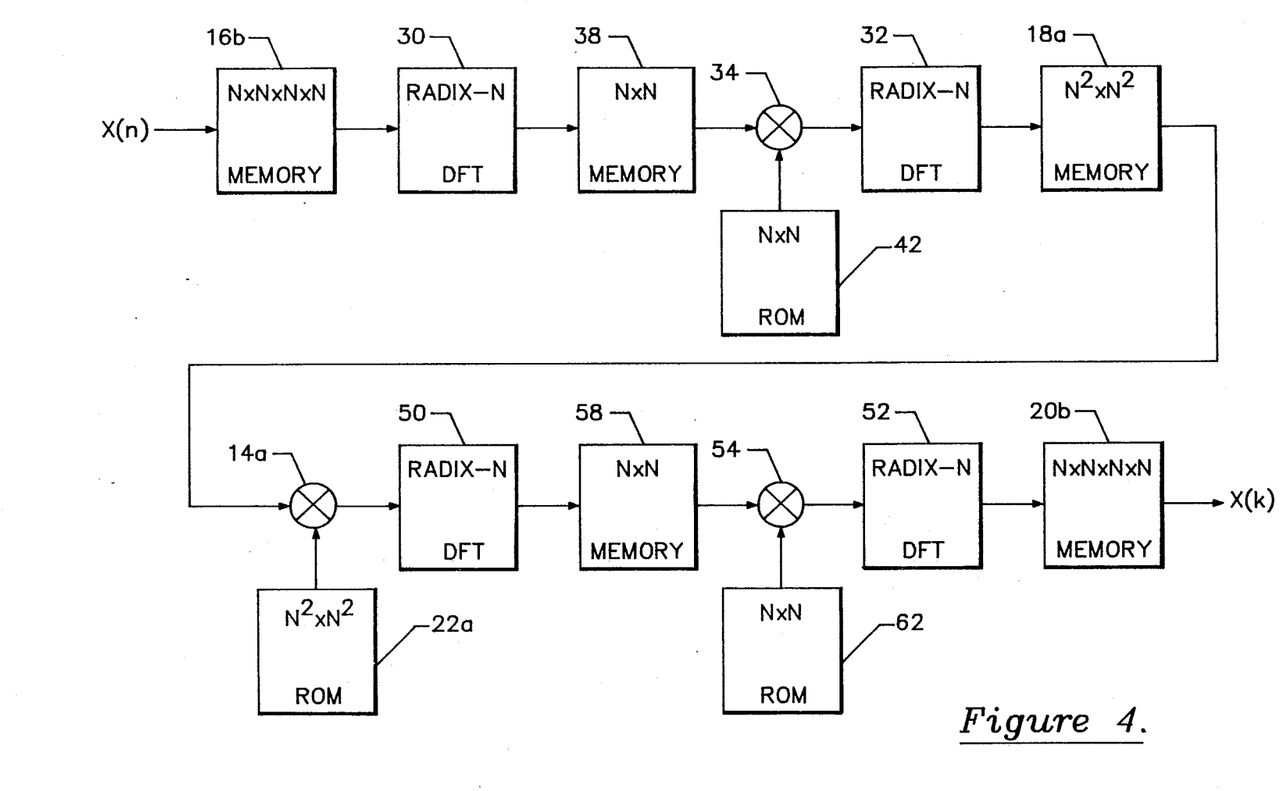
FIG. 4 is a block diagram of a preferred radix-$N^4$ DFT processor requiring less memory.

FIG. 4 shows how the amount of memory required in the radix-$N^4$ DFT system can be reduced by omitting memories 36, 40, 56 and 60. For reasons to be explained below, this requires substituting $N \times N \times N \times N$ 4-dimensional address-reversing memories 16b and 20b for the $N^2$ by $N^2$ upper/lower address reversing memories 16a and 20a.

Referring to FIG. 3, $N^2$ by $N^2$ memory 16a receives and stores the input data in row order and then reads out the data in column order. Each row or column is a sequence of $N^2$ data values.

The collection of circuits enclosed by the dashed line 10a functions as a radix-$N^2$ DFT processor which operates on one set of $N^2$ data values at a time, producing one set of $N^2$ transformed data values at the output of memory 40 for each set of $N^2$ input data values received at the input of memory 36.

The first column of $N^2$ data values read out from $N^2$ by $N^2$ memory 16a is transformed by radix-$N^2$ DFT processor 10a to produce a sequence of $N^2$ transformed data values which will be denoted $Y_1(k)$, for $k = 1, 2, 3, \ldots N^2$. Similarly, the second column of data values from $N^2$ by $N^2$ memory 16a is transformed by DFT processor 10a to produce a sequence of $N^2$ transformed data values denoted $Y_2(k)$. This is repeated for each column read out from memory 16a until the last column produces a sequence of $N^2$ transformed data values denoted $Y_{N^2}(k)$.

$N^2$ by $N^2$ memory 18a stores the transformed data sequences $Y_i(k)$ in row order and then reads them out in column order. That is, the sequence $Y_1(k)$ is stored in the first row of memory 18a, the sequence $Y_2(k)$ is stored in the second row of memory 18a, and more generally, the sequence $Y_i(k)$ is stored in the i-th row of memory 18a, for i ranging from 1 to $N^2$.

Memory 18a then reads out this data in column order. The first column read out from memory 18a consists of the first data value in each of the transformed sequences $Y_i(k)$; i.e., the first column read out from memory 18a is the sequence $Y_1(1), Y_2(1), Y_3(1), \ldots Y_{N^2}(1)$. Similarly, the i-th column read out of memory 18a, for i ranging from 1 to $N^2$, is the sequence of values $Y_1(i), Y_2(i), Y_3(i) \ldots Y_{N^2}(i)$.

It will now be explained how the function of N by N memory 56 can be absorbed into $N^2$ by $N^2$ memory 16a, thereby permitting memory 56 to be eliminated. N by N memory 56 stores one column at a time from $N^2$ by $N^2$ memory 18a and reorders it via the upper/lower address reversing method defined earlier. Since each data value in such a column is a transformed data value from a different transformed sequence $Y_i(k)$, the reordering performed by N by N memory 56 is equivalent to changing the order in which the $N^2$-length transformed data sequences $Y_i(k)$ are received by $N^2$ by $N^2$ memory 18a, which in turn is equivalent to changing the order in which the $N^2$-length columns of input data sequences are read out from $N^2$ by $N^2$ memory 16a.

More specifically, N by N memory 56 can be eliminated if the column address or index of the $N^2$ by $N^2$ memory 16a is divided into upper and lower (most and least significant) halves, and the two halves are swapped. The order in which the columns are read out from memory 16a should then be the order resulting from incrementing the column address or index of memory 16a after the upper and lower halves of the column address have been swapped.

This reordering of the columns read out from memory 16a does not alter the values of the DFT's performed by radix-$N^2$ DFT processor 10a, because processor 10a transforms each $N^2$-length column independently of the other columns received from memory 16a.

By the same reasoning used to explain the elimination of N by N memory 56, it can be seen that N by N memory 36 can be eliminated if $N^2$ by $N^2$ memory 16a is modified to change the order of the rows in which the input data x(n) are stored. Specifically, the order in which the input data is stored into rows in memory 16a should be the order resulting from incrementing the row address of memory 16a after the upper and lower halves of the row address have been swapped.

Similarly, N by N memories 40 and 60 can be eliminated if $N^2$ by $N^2$ memory 20a is modified so as to reorder the output data X(k) in the way just described for $N^2$ by $N^2$ memory 16a.

FIG. 4 shows the radix-$N^4$ DFT processor obtained by eliminating N by N memories 36, 40, 56 and 60 and modifying $N^2$ by $N^2$ memories 16a and 20a as just described. The modified $N^2$ by $N^2$ memories are shown as $N \times N \times N \times N$ memories 16b and 20b.

Table 2 illustrates the reordering performed by memories 16b and 20b. Data is stored in each memory in the order shown in the left half of Table 2, and then it is read out from that memory in the order shown in the right half of Table 2.

The reordering illustrated in Table 2 may be called 4-dimensional index reversing because it is performed by receiving and storing data x(n) in the order $n = 0, 1, 2, \ldots N^4 - 1$; defining a new 4-dimensional index (a, b, c, d) where $n = aN^3 + bN^2 + cN + d$; reversing the order of the four indices; and then reading out the data in the order $m = 0, 1, 2, \ldots N^4 - 1$, where $m = dN^3 + cN^2 + bN + a$.

TABLE 2

| NxNxNxN Memory Input and Output Sequence | |
|---|---|
| INPUT (WRITE) | OUTPUT (READ) |
| n abcd | n dcba |
| 0 0000 | 0 0000 |
| 1 0001 | 8 0001 |
| 2 0010 | 4 0010 |
| 3 0011 | 12 0011 |
| 4 0100 | 2 0100 |
| 5 0101 | 10 0101 |
| 6 0110 | 6 0110 |
| 7 0111 | 14 0111 |
| 8 1000 | 1 1000 |
| 9 1001 | 9 1001 |
| 10 1010 | 5 1010 |
| 11 1011 | 13 1011 |
| 12 1100 | 3 1100 |
| 13 1101 | 11 1101 |
| 14 1110 | 7 1110 |
| 15 1111 | 15 1111 |

Figure 5A:
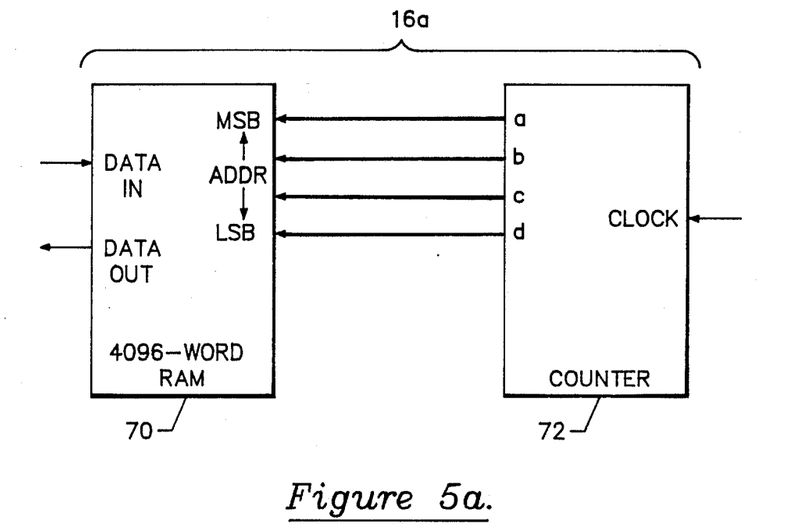
FIGS. 5a and 5b are block diagrams of a NxNxNxN memory showing the two addressing modes.
Figure 5B:
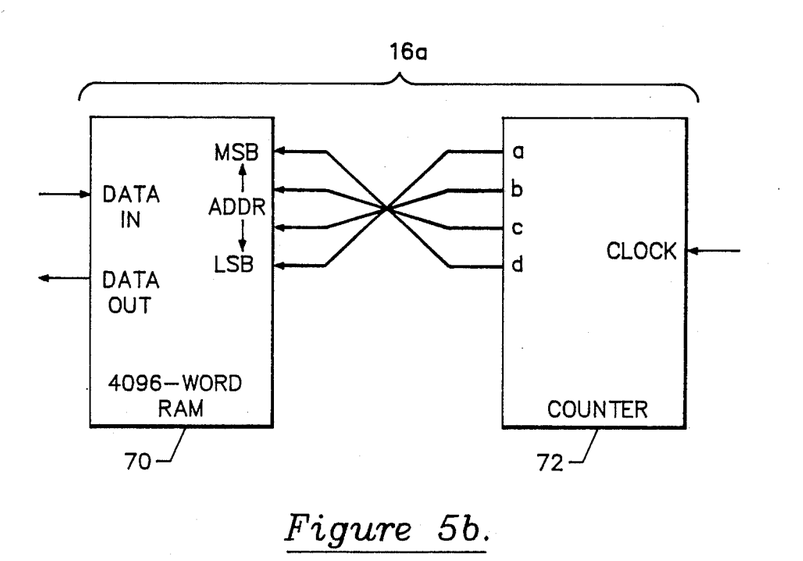

FIG. 5 shows how one of the 4-dimensional address-reversing memories 16b or 20b can be implemented with a conventional random-access memory (RAM) 70 and a binary counter 72. FIG. 5 shows an example wherein $N=8$, $N^4=4096$, and the memory has 4,096 words of storage. The binary counter 72 has a 12-bit output. In the drawing, each line connecting the counter 72 to the RAM 70 represents three bits. The three most significant bits (MSB) of the counter output are represented as "a", the next three as "b", the next three as "c", and the three least significant bits (LSB) as "d".

FIG. 5a shows the connection of the output of the counter 72 to the address input of the RAM 70 in one of the two addressing modes, and FIG. 5b shows the connection in the reverse mode. These two modes produce the ordering shown in columns 1 and 4, respectively, of Table 2.

We claim:

1. A processor for performing the radix-$N^2$ discrete Fourier transform (DFT) of a sequence of $N^2$ input data values, where N represents a predetermined integer, comprising:
   means for providing a first sequence of $N^2$ input data values in upper/lower address reversed order;
   a first radix-N DFT processor circuit for receiving said first sequence of $N^2$ input data values, dividing said first sequence into N groups of N values each, and producing a second sequence of N groups of N transformed data values, wherein each group of transformed data values is the radix-N DFT of the corresponding group of N data values in the first sequence;
   a first circuit and a second circuit each having an input and an output, the input of the first circuit being connected to receive the second sequence from the first radix-N DFT circuit, output of the first circuit being connected to the input of the second circuit, and the output of the second circuit producing a third sequence;
   wherein one of said first and second circuits is a multiplier circuit for receiving a sequence of $N^2$ data values and producing a sequence of $N^2$ output data values, wherein each output data value equals the corresponding input data value multiplied by a weighting factor whose value is a predetermined function of the position of the data value in the sequence; and
   wherein the other one of said two circuits is a memory circuit for receiving a sequence of $N^2$ data values and outputting the $N^2$ data values in an upper/lower address reversed order; and
   a second radix-N DFT processor circuit for receiving the third sequence of $N^2$ data values, dividing the third sequence into N groups of N values each, and producing a fourth sequence of $N^2$ transformed data values having N groups of N values each, wherein each group of transformed data values is the radix-N DFT of the corresponding group of data values in the third sequence.

2. A processor as set forth in claim 1, wherein:
   said first circuit is said memory circuit and said secnd circuit is said multiplier circuit; and
   said processor also comprises an additional memory circuit for storing the weighting factors for use in said multiplier circuit.

3. A processor as set forth in claim 1, wherein:
   the means for providing a first sequence of $N^2$ input data values includes an $N \times N$ memory.

4. A processor as set forth in claim 1, and further comprising:
  means for (i) receiving the fourth sequence of $N^2$ transformed data values and (ii) outputting said data values in an upper/lower address reversed order.

5. A processor in accordance with claim 1 wherein said means for providing a first sequence of $N^2$ input data values comprises a memory circuit for receiving a sequence of $N^2$ data values and feeding such data values in an upper/lower address reversed order to the first radix-N DFT processor circuit as said first sequence of input data values.

6. A processor for performing a radix-$N^4$ discrete Fourier transform (DFT) of a sequence of $N^4$ input data values, where N represents a predetermined integer, comprising:
  first and second radix-$N^2$ DFT processors, each having
    input memory means, for providing a first sequence of $N^2$ input data values in upper/lower address reversed order,
    a first radix-N DFT processor circuit for receiving said first sequence of $N^2$ input data values, dividing said first sequence into N groups of N values each, and producing a second sequence of N groups of N transformed data values, wherein each group of transformed data values is the radix-N DFT of the corresponding group of N data values in the first sequence,
    a first circuit and a second circuit each having an input and an output, the input of the first circuit being connected to receive the second sequence from the first radix-N DFT circuit, output of the first circuit being connected to the input of the second circuit, and the output of the second circuit producing a third sequence,
    wherein one of said first and second circuits is a multiplier circuit for receiving a sequence of $N^2$ output data value, wherein each output data value equals the corresponding input data value multiplied by a weighting factor whose value is a predetermined function of the position of the data value in the sequence, and
    wherein the other one of said two circuits is an intermediate memory circuit for receiving a sequence of $N^2$ data values and outputting the $N^2$ data values in an upper/lower address reversed order,
    a second radix-N DFT processor circuit for receiving the third sequence of $N^2$ data values, dividing the third sequence into N groups of N values each, and producing a fourth sequence of $N^2$ transformed data values having N groups of N values each, wherein each group of transformed data values is the radix-N DFT of the corresponding group of data values in the third sequence,
    output memory means connected to receive the fourth sequence of $N^2$ data values from the second radix-N DFT processor;
  means connected to the input of the first radix-$N^2$ DFT processor, for providing a sequence of $N^2 \times N^2$ input data values;
  an additional memory circuit for receiving a sequence of $N^2 \times N^2$ data values as output from the first radix-$N^2$ DFT processor; and
  an additional multiplier circuit for receiving a sequence of $N^2 \times N^2$ data values from the additional memory circuit and multiplying them by corresponding weighting factors to produce a sequence of $N^2 \times N^2$ output data values for input to the second radix-$N^2$ DFT processor;
  wherein the additional memory circuit and the additional multiplier circuit are connected in cascade between the first and second radix-$N^2$ DFT processors, to form a radix-$N^4$ DFT processor.

7. A processor for performing a radix-$N^4$ discrete Fourier transform (DFT) of a sequence of $N^4$ input data values, where N represents a predetermined integer, comprising:
  first and second radix-$N^2$ DFT processors, each having
    a first radix-N DFT processor circuit for receiving a first sequence of $N^2$ input data values in upper/lower address reversed order, dividing said first sequence into N groups of N values each, and producing a second sequence of N groups of N transformed data values, wherein each group of transformed data values is the radix-N DFT of the corresponding group of N data values in the first sequence,
    a first circuit and a second circuit each having an input and an output, the input of the first circuit being connected to receive the second sequence from the first radix-N DFT circuit, output of the first circuit being connected to the input of the second circuit, and the output of the second circuit producing a third sequence,
    wherein one of said first and second circuits is a multiplier circuit for receiving a sequence of $N^2$ data values and producing a sequence of $N^2$ output data values, wherein each output data value equals the corresponding input data value multiplied by a weighting factor whose value is a predetermined function of the position of the data value in the sequence, and
    wherein the other one of said two circuits is an intermediate memory circuit for receiving a sequence of $N^2$ data values and outputting the $N^2$ data values in an upper/lower address reversed order, and
    a second radix-N DFT processor circuit for receiving the third sequence of $N^2$ data values, dividing the third sequence into N groups of N values each, and producing a fourth sequence of $N^2$ transformed data values having N groups of N values each, wherein each group of transformed data values is the radix-N DFT of the corresponding group of data values in the third sequence;
  an $N \times N \times N \times N$ four-dimensional address-reversing memory means connected to the input of the first radix-$N^2$ DFT processor, for providing a sequence of $N^2 \times N^2$ input data values;
  an additional memory circuit for receiving a sequence of $N^2 \times N^2$ data values as output from the first radix-$N^2$ DFT processor;
  an additional multiplier circuit for receiving a sequence of $N^2 \times N^2$ data values from the additional memory circuit and multiplying them by corresponding weighting factors to produce a sequence of $N^2 \times N^2$ output data values for input to the second radix-$N^2$ DFT processor; and
  a second $N \times N \times N \times N$ four-dimensional address-reversing memory means connected to the output of the second radix-$N^2$ DFT processor;
  wherein the additional memory circuit and the additional multiplier circuit are connected in cascade between the first and second radix-$N^2$ DFT processors, to form a radix-$N^4$ DFT processor.

* * * * *